Figure 1:
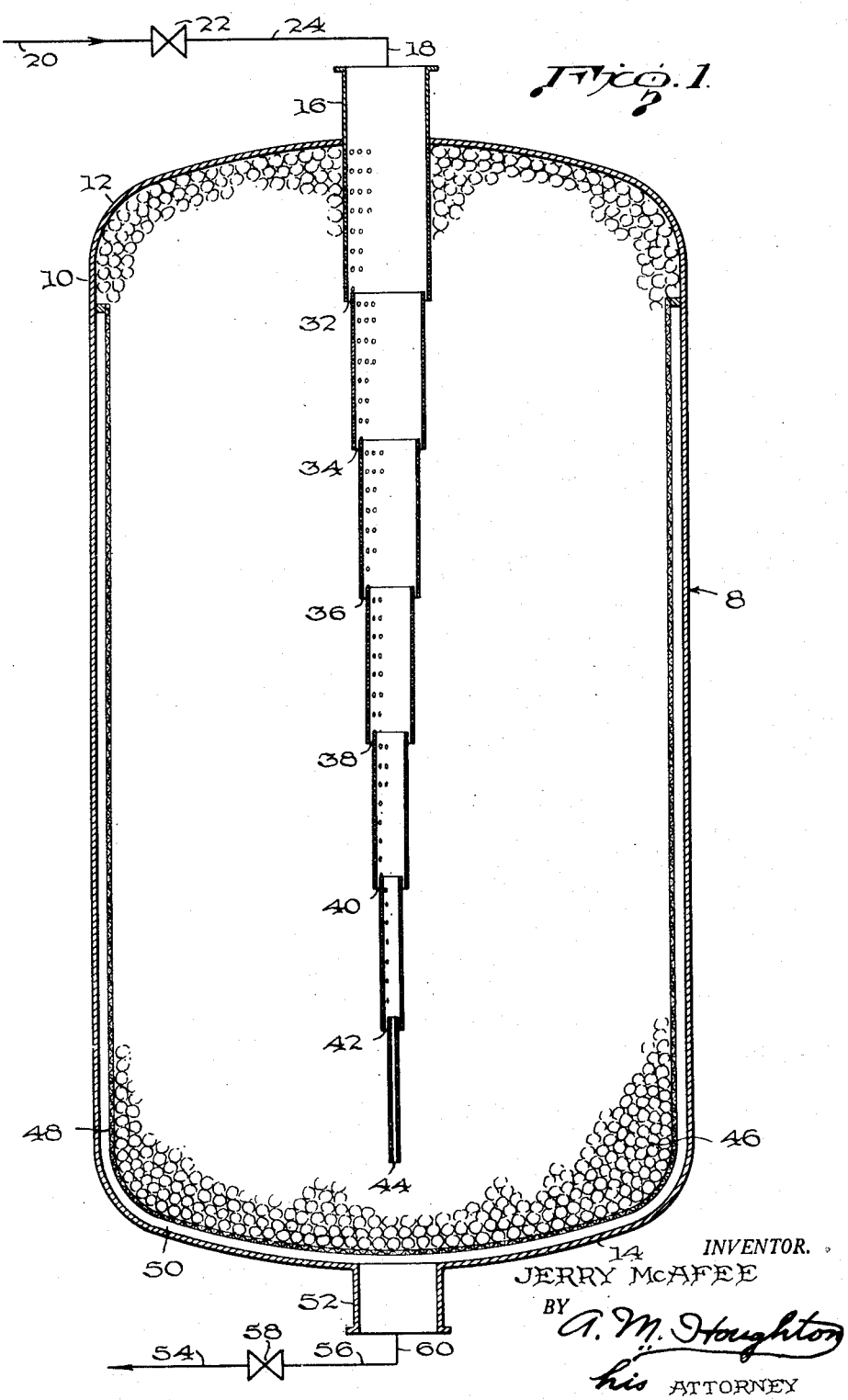

May 19, 1953   J. McAFEE   2,639,224
CATALYTIC REACTOR
Filed Aug. 31, 1950   2 Sheets-Sheet 1

INVENTOR.
JERRY McAFEE
BY A. M. Houghton
his ATTORNEY

May 19, 1953        J. McAFEE        2,639,224
CATALYTIC REACTOR
Filed Aug. 31, 1950        2 Sheets-Sheet 2
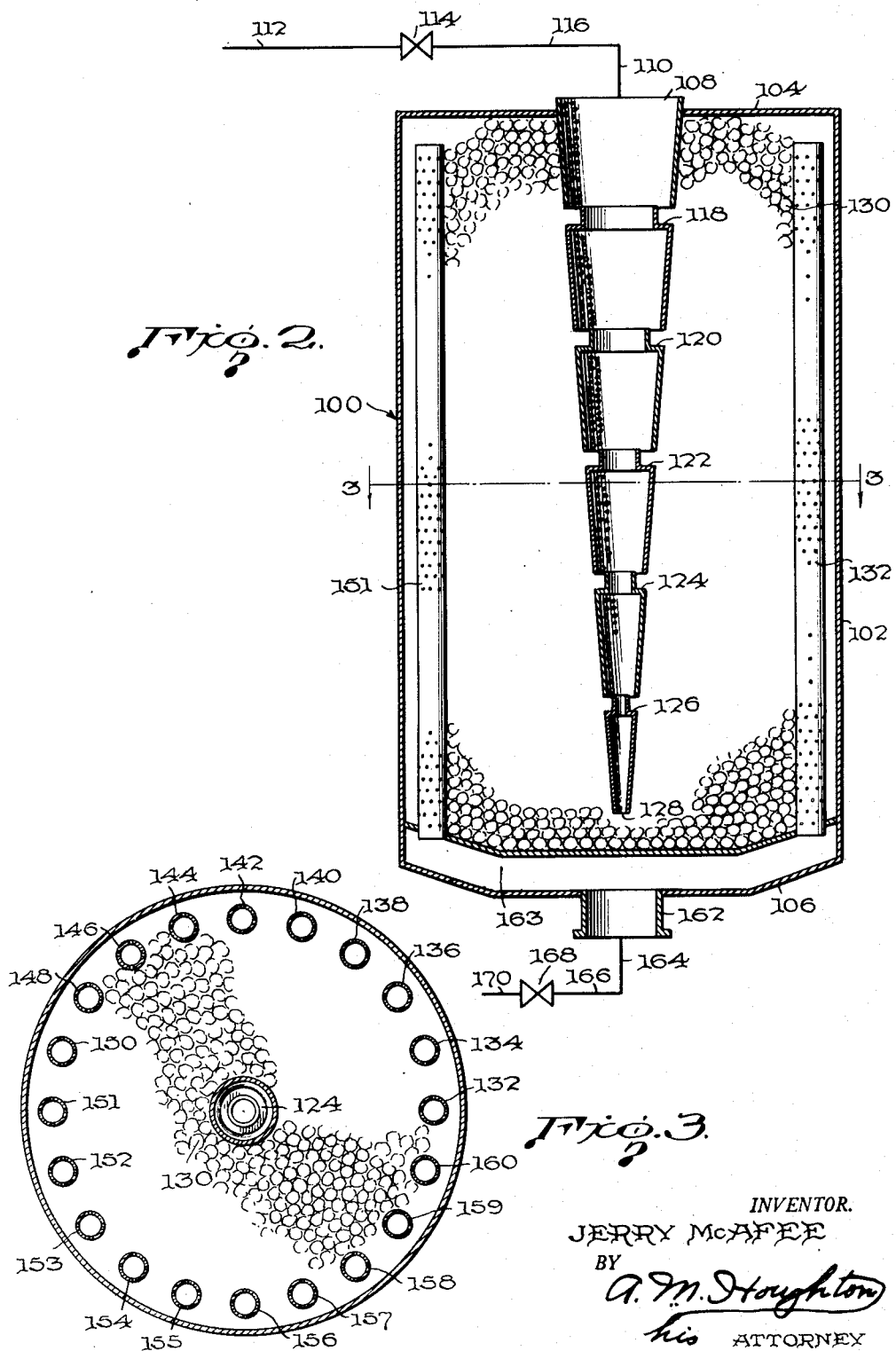
INVENTOR.
JERRY McAFEE
BY
A. M. Houghton
his ATTORNEY Patented May 19, 1953

2,639,224

UNITED STATES PATENT OFFICE 2,639,224

CATALYTIC REACTOR

Jerry McAfee, Oakmont, Pa., assignor to Gulf Oil Corporation, Pittsburgh, Pa., a corporation of Pennsylvania Application August 31, 1950, Serial No. 182,582

4 Claims. (Cl. 23—288)

This invention relates to a catalytic reactor and more particularly to a catalytic reactor in which the fluid to be treated is in the mixed liquid and vapor phase and is caused to pass through a body of particulate catalytic material under controlled conditions to effect a desired alteration in the nature of the fluid.

One of the principal problems encountered with prior art type catalytic reactors in which a catalyst or contact is held in a fixed position in the reactor arises from the fact that a high pressure drop is developed across the reactor in pressurized reactions. The maximum allowable pressure drop in these instances is a function of either the available gas pressure, or of the maximum crushing pressure which the catalyst or its support can tolerate. When this point is reached at a gas rate lower than that required, two expedients are normally open, these being to increase the number of reactors which are being processed, or to increase the diameter : height ratio of the reactor. The first of these expedients is expensive since both the cost and complexity of the total unit is closely related to the number of reactors that are required. The second expedient is usually not available due to the physical limitations on the diameter of the type vessel which can be built to withstand pressurized conditions.

This problem has been at least partially overcome by means of a radial type flow apparatus. However this has given rise to difficulty when the feed charge comprises droplets of liquid entrained in a vapor. This is commonly the case with high pressure processes employing heavy charge stocks such as destructive hydrogenation, catalytic and contact hydrodesulfurization, etc. In these and related processes a maldistribution of the process stream is likely to occur due to the fact that there is a strong tendency for the liquid portion of the two-phase feed to fall to the bottom of the catalytic reactor while the gaseous portion is either distributed uniformly, or more likely is forced preferentially through the upper portion of the catalyst bed. The result of this maldistribution leads to a lower conversion of the charge, poorer catalytic action, and greater deposition of coke on the catalyst.

This invention has as an object to provide a catalytic reactor in which a biphase charge stock is equally distributed throughout a catalyst bed, so as to provide the optimum utilization of the catalytic material.

A further object is to provide an improved catalytic reactor for obtaining the maximum yield from a biphase charge stock.

A still further object is to provide a catalytic reactor in which uniform conversion of the phases of a biphase feed charge stock in pressurized reactions may be obtained. Other objects will appear hereinafter.

These and other objects are accomplished by the present invention which comprises a catalytic reactor for liquid-gas biphase charge stocks comprising in combination a closed vessel, peripherally located collecting means within said vessel, inlet means for said biphase charge extending axially within said vessel having a plurality of discharge means positioned along the length at spaced intervals, each of said discharge means extending at least substantially around the circumference of said inlet means and adapted to remove a peripheral portion of said biphase charge, and outlet means extending from said closed vessel.

Accompanying Figure 1 is a vertical sectional view of a form of apparatus embodying the principles of my invention.

Accompanying Figure 2 is a vertical sectional view of another form of apparatus embodying the principle of my invention.

Accompanying Figure 3 is a horizontal sectional view taken along line 3—3 of Figure 2.

Referring to the accompanying Figure 1, the body of catalytic reactor 8 is made up of an elongated substantially cylindrical outer shell 10 provided with elliptical heads 12 and 14 at its top and bottom ends, respectively. The upper head 12 is provided with vertical perforated inlet means 16 connected to lead pipe 18. Preheated two-phase liquid and vapor feed pass into lead pipe 18 by means of line 20, valve 22 and line 24. Perforated inlet means 16 extends axially through the catalytic reactor 8 and is provided with a plurality of spaced shave-off port means 32, 34, 36, 38, 40, 42 and 44. Each of these shave-off port means consists of a discontinuous reduction in the size of perforated inlet means 16 such that the open annulus which is left facing the incoming feed charge comprises a substantially equal percentage of the original cross section of perforated inlet means 16. Thus in the accompanying Figure 1, in which seven shave-off port means are shown, including terminal shave-off port means 44, the area of the open annulus at each of these ports should equal about one-seventh of the area of the uppermost portion of perforated inlet means 16.

Perforated inlet means 16 is embedded in a mass of granular catalyst material 46. Extending for a substantial distance within outer shell 10 of reactor 8 is the collecting means, namely, pervious inner member 48 which is disposed within said shell concentric with and spaced so as to provide an annular space 50 therebetween. Outlet means 52 extends through elliptical head 14 of outer shell 10 into annular space 50. The reaction products are removed from reactor 8 through outlet means 52, lines 60 and 56, valve 58 and line 54.

The operation of this catalytic reactor can be conveniently illustrated in connection with the destructive hydrogenation of a heavy hydrocarbon charge stock such as a reduced or topped crude. This heavy charge and hydrogen or a hydrogen-containing gas is first heated to reaction temperature such as of the order of 650° to 1000° F. causing the hydrocarbon portion of the feed to assume a mixed phase form, that is, a portion will be in the vapor phase with the remainder being in the liquid phase. The liquid phase is usually distributed within the vapor phase as fine droplets or mist. The system is under a high state of pressure such as of the order of 10 atmospheres, 50 atmospheres, 250 atmospheres and beyond. This two-phase charge enters the system through line 20, valve 22, line 24 and lead pipe 18, from which it passes into perforated inlet means 16. Descending through perforated inlet means 16 the vapors and a portion of the liquid charge are removed through the perforated sides of perforated inlet means 16 and pass through catalyst bed 46. Catalyst bed 46 comprises a granular or finely divided hydrogenating catalytic material such as molybdates, or tungstates, or metals and their oxides of the sixth and eighth groups of the periodic table which may be supported on carriers or bases such as silica-alumina, alumina, aluminum silicates, "Alfrax," "Porocel," diatomaceous earth, clays, kieselguhr, etc. The destructively hydrogenated products are removed from reactor 8 through pervious member 48, annular space 50, outlet means 52, line 60, line 56, valve 58 and line 54. The remainder of the liquid portion of the charge is removed through shave-off port means 32, 34, 36, 38, 40, 42 and 44 and passes at an angle to perforated inlet means 16 through catalyst bed 46. This liquid portion is removed from the reactor by passing through pervious member 48, annular space 50, outlet means 52, line 60, line 56, valve 58 and line 54. Similar conditions of temperature, and pressure, and analogous catalyst types may be used with hydrodesulfurization processes in which sulfur is removed from sulfur-bearing hydrocarbon feed stocks.

Another modification of my invention is shown in accompanying Figures 2 and 3. Referring to these figures the body of catalytic reactor 100 is made up of an elongated substantially cylindrical outer shell 102, provided with heads 104 and 106. Upper head 104 is provided with vertical perforated inlet means 108 connected to lead pipe 110. Preheated two phase liquid and vapor feed pass into lead pipe 110 by means of line 112, valve 114, and line 116. Perforated inlet means 108 extends axially through the catalytic reactor 100 and is provided with a plurality of shave-off discharge gutter means 118, 120, 122, 124, 126 and 128 spaced at even distances along the central axis of reactor 100. Each of these shave-off discharge gutter means consists of circumferential discharge area openings in the wall of perforated inlet means 108 and of a flange arrangement running the internal circumference of perforated inlet means 108 and adapted to effect a discontinuous reduction in the internal cross sectional area of perforated inlet means 108 so that the open annulus area of perforated inlet means 108 which is left facing the incoming feed charge after each shave-off discharge gutter means is such that an equal amount of charge is removed through each shave-off discharge gutter means. Thus, in accompanying Figure 2, in which six evenly spaced along the central axis shave-off discharge gutter means are shown, including terminal shave-off gutter means 128, the area of each open annulus of perforated inlet means 108 at each shave-off discharge gutter means is one-sixth that of the widest cross sectional area of perforated inlet means 108. Thus if the cross sectional area of the widest section of perforated inlet means 108 is taken as being 100 per cent, the internal annulus cross sectional area at gutter means 118 will be 83⅓ per cent of this area, that at gutter means 120 will be 66⅔ per cent of this area, etc. The wall openings on perforated inlet means 108 which form a part of each of shave-off discharge gutter means 118, 120, 122, 124, 126 and 128 are larger than those extending along the length of the rest of perforated inlet means 108.

Perforated inlet means 108 is embedded in a mass of granular catalyst material 130. Also embedded within catalyst mass 130 and extending concentrically and evenly spaced within the outer periphery of reactor 100 are perforated finger type collecting conduits 132, 134, 136, 138, 140, 142, 144, 146, 148, 150, 151, 152, 153, 154, 155, 156, 157, 158, 159 and 160. These perforated finger type collecting conduits join together at collecting manifold 163. Collecting manifold 163 is connected to outlet means 162 which extends through the lower head 106 of reactor 100. Lines 164 and 166, valve 168 and line 170 extend outside the reactor from outlet means 162.

As I have indicated, my invention is applicable to all catalytic chemical processes employing a biphase feed consisting of mixed liquid and gaseous phase. Thus my invention is applicable to catalytic processes in the petroleum industry employing biphase feed such as polymerization, cracking, isomerization, etc. It is also applicable to catalytic processes utilized in the organic chemical industry, such as oxidation of hydrocarbons, hydroformylation of olefins (e. g. the so-called "Oxo Process"), and alkylation processes in which mixed liquid and gaseous biphase feeds are utilized.

In place of the number of shave-off means which I have shown, any number may be used. Furthermore, while the preferred arrangement of shave-off means involves: (1) each shave-off means having an equal discharge area with each of the discharge areas of the remaining shave-off means; and (2) each discharge area comprising an equal percentage of the largest cross sectional area of the perforated inlet means; it may be replaced with other arrangements.

Thus, other forms of discharge means may be used. Also, while the outer shell of the reactor should be substantially cylindrical in the preferred form of my apparatus, it may in some cases be modified to non-cylindrical shape. Moreover, other forms of collecting means may be substituted in place of the concentric pervious inner member shown in Figure 1 or the pervious finger type collecting conduit shown in Figures 2 and 3. Also in many forms of chemical conversion it may be advisable to have the outlet means in the upper portion of the reactor and the inlet means extending upwardly from the bottom of the reactor and my invention is applicable to this modification.

By the utilization of my invention an equal distribution of the liquid and gaseous phases of the feed charge may be achieved. Furthermore, my reactor allows for the minimum pressure drop which may be achieved, since the flow of charge is in a radial direction within the reactor rather than lengthwise.

What I claim is:

1. A catalytic reactor for contacting a liquid-gas biphase charge stock with a bed of catalyst, comprising in combination a tubular elongated vessel which is closed at each end, an inlet for biphase charge stock at the central portion of one end of the elongated vessel, means positioned along the longitudinal axis of the elongated vessel for equally distributing biphase charge stock throughout a catalyst bed in the elongated vessel, said means comprising a plurality of separated tubular elements of successively smaller diameter, positioned along the axis of the elongated vessel in co-axial alignment, the element of largest diameter being connected to the inlet, the other of said tubular elements being each presented at one end to the end of an adjacent element of larger diameter nearer the inlet and radially spaced from the wall of such larger element to define an annular shave-off port facing the incoming feed charge, and each said element having perforations in the tubular wall thereof for radial discharge of the fluid charge stock throughout the contained catalyst bed, the several said elements being so positioned that both ends thereof are at spaced intervals along the axis and at different distances from the inlet and so that each successive tubular element is of smaller diameter than the preceding tubular element, collecting means for reaction product positioned at the periphery of the elongated vessel, a catalyst zone comprising the entire space intermediate the collecting means and the co-axial tubular elements, and means for removing collected reaction product from the tubular elongated vessel.

2. A catalytic reactor for contacting a liquid-gas biphase charge stock with a bed of catalyst, comprising in combination a tubular elongated vessel which is closed at each end, an inlet for biphase charge stock at the central portion of one end of the elongated vessel, means positioned along the longitudinal axis of the elongated vessel for distributing biphase charge stock throughout a catalyst bed in the elongated vessel, said means comprising a plurality of perforated co-axial tubular elements of different diameter partly telescoping one another and positioned in succession along the axis of the elongated vessel, the element of largest diameter being connected to the inlet means, the other of said tubular elements being positioned with one end radially spaced from the wall of the adjacent tubular element nearer the inlet to define a shave-off port facing the incoming feed charge, the several said tubular elements being so positioned that their respective ends are at spaced intervals along the axis and at different distances from the inlet and so that each successive tubular element is of smaller diameter than the preceding tubular element, the difference in diameter between adjacent elements being such that the area of the shave-off ports defined thereby between each pair of tubular elements is approximately equal, collecting means for reaction products positioned at the periphery of the elongated vessel, a catalyst zone comprising the entire space intermediate the cooling means and the co-axial tubular elements, and means for removing collected reaction product from the tubular elongated vessel.

3. A catalytic reactor for contacting a liquid-gas biphase charge stock with a bed of catalyst, comprising in combination a tubular elongated vessel which is closed at each end, an inlet for biphase charge stock at the central portion of one end of the elongated vessel, means positioned along the longitudinal axis of the elongated vessel for distributing biphase charge stock throughout a catalyst bed in the elongated vessel, said means comprising a plurality of separated, co-axial tubular elements of different diameter but substantially equal length, positioned in succession along the axis of the elongated vessel and provided with perforations in the tubular walls thereof for radial discharge of fluid throughout the contained catalyst bed, the element of largest diameter being connected to the inlet and the other of said tubular elements being positioned so that both ends of said other elements are at spaced intervals along the axis and at different distances from the inlet, each successive tubular element being of smaller diameter than the adjacent tubular element nearer the inlet, and having one end presented to such adjacent element and spaced from the wall thereof to provide an annular shave-off port facing the incoming feed charge, collecting means for reaction product positioned at the periphery of the elongated vessel, a catalyst zone comprising the entire space intermediate the collecting means and the co-axial tubular elements, and means for removing collected reaction product from the tubular elongated vessel.

4. A catalytic reactor for contacting a liquid-gas biphase charge stock with a bed of catalyst, comprising in combination a tubular elongated vessel which is closed at each end, an inlet for biphase charge stock at the central portion of one end of the elongated vessel, means positioned along the longitudinal axis of the elongated vessel for distributing biphase charge stock throughout a catalyst bed in the elongated vessel, said means comprising a plurality of perforated tubular elements of different diameter in partly telescoped arrangement and positioned in succession along the axis of the elongated vessel, the element of largest diameter being connected to the inlet and the other said tubular elements being positioned so that the respective ends of each are at spaced intervals along the axis and at different distances from the inlet and so that each successive tubular element is of smaller diameter than the preceding tubular element in which it is partly telescoped and spaced therefrom in radial direction to define an annular shave-off port between each pair of adjacent elements facing the inlet, the successive reduction in diameter of the several elements being such that the total area of said shave-off ports is substantially equal to the area of the inlet, a pervious inner shell positioned near to but in spaced and concentric relation within the tubular elongated vessel, an outlet connected to that end of the tubular elongated vessel opposite to the inlet end, said outlet communicating with the space between the pervious inner shell and the wall of the elongated vessel, and a catalyst zone comprising the entire space intermediate the pervious inner shell and the co-axial tubular elements.

JERRY McAFEE.

References Cited in the file of this patent

UNITED STATES PATENTS

| Number | Name | Date |
|---|---|---|
| 456,742 | Smidth | July 28, 1891 |
| 714,843 | Wentz | Dec. 2, 1902 |
| 767,335 | Evers | Aug. 9, 1904 |
| 1,113,151 | Chisholm | Oct. 6, 1914 |
| 1,496,094 | Moetheli | June 3, 1924 |
| 1,558,119 | Sherban | Oct. 20, 1925 |
| 2,079,934 | Fitch, Jr. et al. | May 11, 1937 |
| 2,138,861 | Hyman | Dec. 6, 1938 |
| 2,305,796 | Seidel | Dec. 22, 1942 |
| 2,315,208 | Kinnaird | Mar. 30, 1943 |
| 2,614,033 | Cornell et al. | Oct. 14, 1952 |

FOREIGN PATENTS

| Number | Country | Date |
|---|---|---|
| 38,936 | Australia | Sept. 25, 1909 |
| 700,034 | France | Dec. 22, 1930 |
| 593,387 | Germany | Nov. 25, 1931 |
| 12,863 | Great Britain | Aug. 4, 1889 |